(12) United States Patent
Kobierzycki et al.

(10) Patent No.: US 8,020,361 B2
(45) Date of Patent: Sep. 20, 2011

(54) MACHINE FOR TRANSFERRING BLANKS FOR CARTONBOARD BOXES

(75) Inventors: Bernard Kobierzycki, Octeville sur Mer (FR); Pierre-Yves Jacob, Octeville sur Mer (FR)

(73) Assignee: Sidel Participations, Octeville Sur-Mer (FR)

( * ) Notice: Subject to any disclaimer, the term of this patent is extended or adjusted under 35 U.S.C. 154(b) by 202 days.

(21) Appl. No.: 12/445,215

(22) PCT Filed: Oct. 10, 2007

(86) PCT No.: PCT/FR2007/001649
§ 371 (c)(1),
(2), (4) Date: Apr. 10, 2009

(87) PCT Pub. No.: WO2008/043913
PCT Pub. Date: Apr. 17, 2008

(65) Prior Publication Data
US 2010/0022372 A1    Jan. 28, 2010

(30) Foreign Application Priority Data

Oct. 11, 2006 (FR) ..................................... 06 08898

(51) Int. Cl.
*B65B 43/24* (2006.01)
*B65B 43/46* (2006.01)
*B65B 43/48* (2006.01)
(52) U.S. Cl. ........ 53/564; 53/284.5; 53/381.1; 53/389.1
(58) Field of Classification Search ..................... 53/564, 53/566, 284.5, 381.1, 389.1; 493/52, 180, 493/309, 416; *B65B 43/24*
See application file for complete search history.

(56) References Cited

U.S. PATENT DOCUMENTS

| | | | |
|---|---|---|---|
| 3,420,037 A | 1/1969 | Villemure et al. | |
| 4,476,973 A | 10/1984 | Kessler et al. | |
| 4,569,182 A * | 2/1986 | Leuvering | 53/381.1 |
| 4,807,428 A * | 2/1989 | Boisseau | 53/564 |
| 4,930,291 A * | 6/1990 | Buisseau | 53/564 |
| 5,727,365 A | 3/1998 | Lashyro et al. | |

FOREIGN PATENT DOCUMENTS

| | | |
|---|---|---|
| DE | 30 23 493 A1 | 3/1982 |
| EP | 0 761 535 A1 | 3/1997 |
| FR | 2 882 727 A1 | 9/2006 |
| WO | 98/32660 A1 | 7/1998 |

* cited by examiner

*Primary Examiner* — Stephen F Gerrity
(74) *Attorney, Agent, or Firm* — Sughrue Mion, PLLC

(57) ABSTRACT

The transfer machine extends between the die-cut blank erecting station and the discharge conveyor on which the resulting boxes are carried away. It has a carriage that moves lengthwise underneath the sole plate of the various stations over which the box blank progresses. The carriage carries a system of clamps having movable upstream and downstream arms for gripping the blanks and a pusher. Together, the clamps and the pusher are used to move the blanks along the sole plate and push the box onto the discharge conveyor. The arms and the pusher are situated on a plate which is vertically movable relative to the carriage and the height of the projecting part of the upstream arms is greater than the height of the downstream arms and than that of the pushers. The upstream arm couple is hinged to the plate and pivots to allow it to retract upstream relative to the machine and beneath the sole plate. This pivoting of the arm couple is combined with the up-down movement of the plate.

12 Claims, 1 Drawing Sheet

MACHINE FOR TRANSFERRING BLANKS FOR CARTONBOARD BOXES

FIELD OF THE INVENTION

This invention relates to machines for wrapping and packaging diverse and varied products such as bottles, flasks, bags, and so on.

It relates more specifically, on these machines, to the conveying device that, after the forming of the cutout, transfers the resulting box blank from one station to the next, which blank is filled with the products to be packaged, then, finally shaped into a closed box.

DESCRIPTION OF THE PRIOR ART

Depending on the type of machine, the conveying device will manage the transfer of the box blank over two or three stations.

For a machine, which can be described as compact, the number of stations is limited to two:—one station where the box blank cutout is erected and where the filling of said blank is also carried out, and, downstream,—one station where said blank is transformed into an actual box and after which said box is removed and transferred to another conveyor.

In the case of a machine where each station is separate, and which is therefore longer and less compact, there is:—the cutout forming station,—the blank filling station, and—the pressing station after which the box is again removed.

The invention relates to the conveying device that enables the various movements of the blank and the box from station to station to be conveniently and practically managed, regardless of the type of machine.

To overcome the problems of endless chain and cleated belt-type conveying devices, document FR 2 882 727 proposes transferring the box blank from station to station by means of a clamp system that is arranged on a carriage, in which said carriage moves under the various stations.

These clamps open and close under the effect of an actuator-type maneuvering member, which is on-board the carriage; by opening, these clamps are retracted under the blank guide soleplate and, by closing, they extend so as to partially project above said soleplate, clamping a box blank.

The carriage can comprise a plurality of clamp sets, for example two, when there are a plurality of distinct stations on the machine:—one station for forming the cutout,—one station for filling the blank, and—one pressing station for shaping the box.

The requirements for ever-increasing speeds necessitate particularly "maneuverable", and above all very effective and precise, transfer devices.

The device described above is a major advance over cleated belt conveyors. However, its structure and the clamp system generate significant inertia, and this inertia is a hindrance with regard to the trend toward high speeds.

Moreover, the projecting portion of the clamps has a relatively small size due to their retraction mode, which is achieved simply by pivoting. This small clamp size adversely affects the gripping of the blank during its transfer, in particular on the upstream side where the stresses are greater due to accelerations and also due to the resistance to be overcome in order to move the blank forward, in particular in the pressing station.

This relatively small size of the active portions of the clamps also has the effect of causing a marking on the boxes, in particular on their upstream portion.

SUMMARY OF THE INVENTION

The invention is intended to improve the features of this type of device so as to reach higher speeds, so as not to constitute a hindrance to the speeds of the other stations.

The invention is also intended to improve the gripping of the blank over the entire course of travel, and even to help to form said blank and maintain the shape over the entire course of travel of the blank.

The device according to the invention enables the gripping of the blank to be improved, and enables the blank to be held in a precise shape over the entire course. This precision of the blank will have a positive influence on the result of the pressing operation; it enables a perfectly calibrated, regular box to be obtained which will not present any problems especially during palletizing.

The invention is also intended to reduce the energy required for operating the device owing to a reduction in the weight of the mobile parts and also owing to an original use of the inertia of the moving elements.

The device according to the invention therefore generally enables the efficacy and precision of handling of the blank to be improved, regardless of the speeds of the machine and regardless of the number of stations to be completed.

The machine for wrapping and packaging diverse and varied products according to the invention comprises a device for transferring blanks and cardboard boxes, which extends between the station for forming the cutouts and the conveyor for removing the boxes obtained, which transfer is carried out according to a cycle that includes operations of erecting the cardboard cutout, filling the blank obtained and pressing the box, and which blank transfer device consists of a carriage that moves longitudinally under the various stations, on a guide system consisting of tracks and/or slides, which guide system is parallel to the stationary soleplate that extends over the entire length of said stations and on which said box blanks advance, which carriage has a clamp system consisting of mobile upstream and downstream arms for gripping said blanks and boxes, and a push member; the clamp-push member assembly enables said blanks and boxes to be moved on said stationary soleplate, then pushed onto the removal conveyor, which upstream and downstream arms and said push member are arranged on a plate that is mobile upwardly and downwardly with respect to said carriage, by suitable means, in order to move said arms and said push member either into the active position for handling the blank and the box on the soleplate, or into the inactive position below the latter.

Also according to the invention, the height of the projecting portion of the upstream arm is greater than that of the downstream arm and the push member, which upstream arm is pivotably connected to the plate and pivots under the effect of suitable means about a horizontal shaft, perpendicular to the movement of the carriage, to enable:—its retraction upstream of the machine and below the soleplate of the various stations when said carriage returns,—then its active positioning for handling the blank during the transfer movement performed by said carriage, and, simultaneously, the opening and closing of the clamp system. This arrangement enables the compactness of the transfer device to be improved, and interference with the cutout extraction device located upstream to be avoided.

According to another arrangement of the invention, the plate is guided with respect to the carriage by means of a slide in the form of a ramp, of which the tilt, with respect to the carriage guide system, is on the order of 45° descending from upstream to downstream, and the movement of said plate on this ramp is performed by suitable means such as, for example, an actuator placed between said plate and said carriage.

Also according to the invention, the upstream arm extends beyond its pivot shaft in the form of a crank of which the end is connected to a stationary point of the carriage by means of a connecting rod, which connecting rod imparts on said arm a pivoting movement that is combined with the rising-falling movement of the plate with respect to said carriage, automatically closing the clamp system during the rise and opening it during the fall.

According to another arrangement of the invention, the downstream arm is arranged on a slide-type support, secured to the plate, which support extends parallel to the carriage guide system, and it is equipped with means for enabling the adjustment of the position of said downstream arm on said support so as to adjust the space between the projecting portions of the two arms according to the format of the cutouts and the box blanks.

Also according to the invention, the push member for the blank and the box is arranged at the end of the support of the downstream arm of the clamp system.

According to another arrangement of the invention, the carriage is powered by means of an actuator-type motor, a linear motor or the like: a servo-motor, or an induction motor.

Also according to the invention, when there are three stations in line, the carriage comprises two clamp systems for simultaneously transferring the blanks from station to station, and a push member located at the downstream end.

According to an alternative embodiment, a similar machine can include a plurality of carriages, in which each carriage is equipped with a clamp system, and, for the downstream carriage, a push member so as to manage the movements of the box blanks and the boxes between two consecutive stations and, in the end, to push the boxes onto the removal conveyor.

BRIEF DESCRIPTION OF THE DRAWINGS

However, the invention will be further detailed in the following description and the appended drawings provided for indicative purposes, in which.

DETAILED DESCRIPTION OF THE INVENTION

Figure 1:
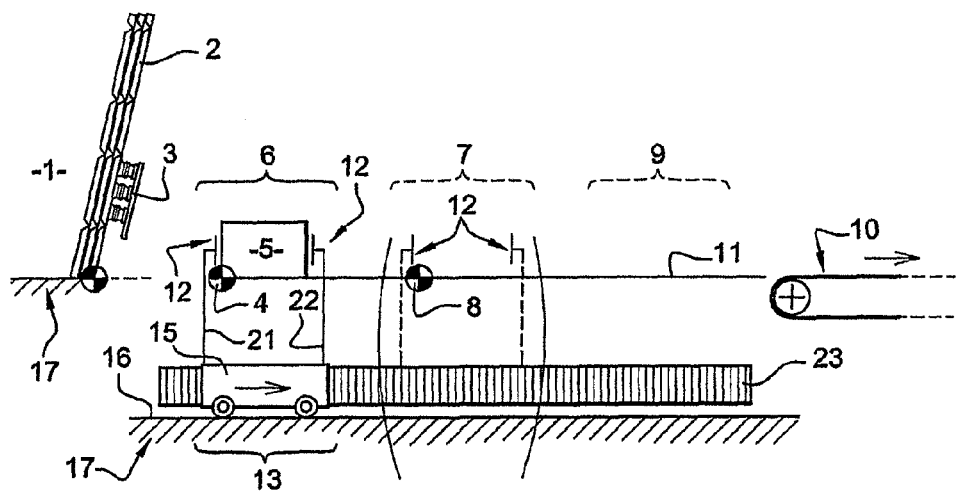
FIG. 1 is a diagrammatic view of a machine equipped with a conveying device according to the invention.

The machine shown in FIG. 1 comprises a storage location 1 in which cutouts 2 are stored. These cutouts 2 are picked up, in a conventional manner, by an extraction arm 3 and are placed in a repository 4 so as to be assembled, in the form of box blanks 5, at the forming station 6.

This machine can be equipped to shape cutouts 2 of the "American box" or "wrap-around" type. The shaping means are not shown.

After assembly, the blank 5 can immediately be filled with the products to be packaged; this filling operation can be performed at the forming station 6 or, as shown in the figure, between parentheses, at a specific station 7 that is arranged just after said forming station 6.

At this filling station 7, the blank is also placed in a repository 8.

After filling, the blank passes to the pressing station 9 where it is transformed into an actual box and is then removed by means of a suitable conveyor 10.

During all of these operations, the blank 5 is moved over a continuous horizontal soleplate 11 that extends from the forming station 6 to the pressing station 9, i.e. it extends between the storage location 1 and the removal conveyor 10. Said soleplate 11 is stationary; it is formed by guides arranged laterally, so as to enable the extractor arm 3 as well as the clamp system 12 that handles the blank 5 to pass.

The invention relates primarily to the conveying device 13 which enables, by means of the clamp system 12, the box blank 5 to be handled at the forming station 6, and enables said blank 5 to be moved from station to station, on the soleplate 11, to the pressing station 9 after which it is pushed onto the removal conveyor 10.

The conveying device 13 shown in FIG. 1 includes, under the soleplate 11, a powered carriage 15; said carriage 15 is capable of moving longitudinally over a guide system 16 that consists of tracks and/or slides secured to the structure 17 of the machine.

Figures 2, 3:
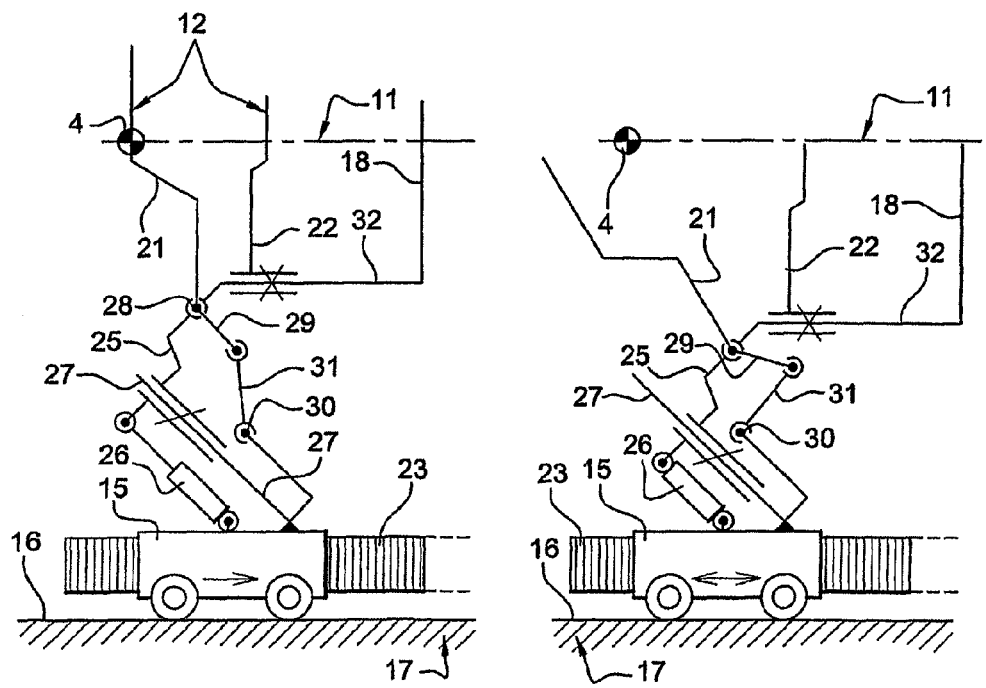
FIG. 2 shows the detail of the conveying device in the form of a functional diagram, in a position that corresponds to the active position for handling a box blank by the clamp system.
FIG. 3 shows the conveying device with the clamp system in the inactive position.

The carriage 15 includes the clamp system 12 as well as a push member 18, not shown in FIG. 1 for the sake of clarity; this push member 18, which is formed by two arms arranged side by side, on a transverse, is shown in FIGS. 2 and 3.

The clamp system 12 is formed by arms that grip the blank 5 in places that correspond to the corners of what will become the box: two arms 21 for the upstream face of said box and two arms 22 for the downstream face.

These pairs of arms 21, 22 move the blank 5 from station to station on the soleplate 11, and they are arranged between the lateral guides that constitute said soleplate 11; the push members 18 take over to push the blank and remove the box where appropriate.

The carriage 15 is capable of moving under the soleplate 11 by means of a drive member that can be formed by an actuator or the like, i.e. a servo-motor or an induction motor.

In FIG. 1, the drive member is formed by a linear motor. This linear motor includes a primary winding, with an electrical power supply, which is arranged on the carriage 15 and a secondary winding consisting of magnets 23, which is associated with the guide system 16 of said carriage 15.

This type of drive member enables quick, precise movements to be performed; it is compact and does not require maintenance. Moreover, with regard to safety, it has very clear advantages; it indeed enables, in consideration of the continuous control of the torque, the movement of the carriage 15 to be stopped very quickly, or even prevented if an obstacle or the like is present.

FIG. 2 shows the conveying device in the form of a functional diagram, in the active position for handling a box blank 5.

This device therefore includes:—the carriage 15 placed on the guide system 16,—the clamp system 12 which consists of upstream arms 21 and downstream arms 22, and—the push members 18; these arms 21, 22 and push members 18 are borne by said carriage 15 by means of a plate 25; said plate 25 is mobile with respect to said carriage 15 in order to enable the active positioning of said arms 21, 22 and push members 18, and in particular the upper ends thereof, or to enable their inactive positioning by retraction under the soleplate 11.

The plate 25 can be moved by means of an actuator 26, for example, which is anchored on the carriage 15, and it moves on a slide in the form of a ramp 27 that is secured to said carriage 15. This ramp 27 is tilted according to an angle on the order of 45° with respect to the guide system 16 of the carriage 15; it is tilted downward, going from upstream to downstream on the machine.

The pair of upstream arms 21 is pivotably connected to the plate 25 about a shaft 28 that is horizontal and transversal, i.e. perpendicular to the system 16 for guiding the carriage 15; this shaft 28 is located above the ramp 27.

The pair of upstream arms 21 pivots automatically when the plate 25 is maneuvered by the actuator 26. Indeed, this pair of upstream arms 21 comprises, opposite the upper end thereof acting as a jaw, with respect to the shaft 28, a crank 29 that is connected to a stationary point 30 on the carriage 15 by means of a connecting rod 31.

The movement of the plate 25 causes, as shown in FIG. 3, the upstream arms 21 to pivot; this pivoting, combined with the downward movement of the plate 25, enables said upstream arms 21 to be retracted below the soleplate 11, and, conversely, the upward movement of the plate 25 causes the active positioning of the end of these upstream arms 21, above said soleplate 11.

This original assembly of the upstream arms 21 enables arms to be provided in which the active portion projecting above the soleplate 11 is relatively large, i.e. larger than that of the downstream arms 22. The height of the active portion of the upstream arms 21 can be on the order of at least twice the height of the projecting portion of the downstream arms 22. A better handling of the blank by the clamp system is obtained; the contact surface between the active portion of the upstream arms 21 is large, thereby avoiding deformations of the box blank 5 at the contact area.

When the carriage 15 arrives below the forming station 6, the plate 25 rises to place the arms 21, 22 and the push members 18 in the active position; during this operation, the upstream arms 21 pivot at the same time that there active portions rise, and these active portions project above the soleplate 11; at the same time, the active portions of the downstream arms 22 and the push members 18 also rise and also project above the level of said soleplate 11.

The upstream 21 and downstream 22 arms form a clamp system 12 that closes on the blank 5, at the cutout 2 forming station. This clamp system 12 closes at the end of the returning course of the carriage 15 and opens at the end of the going course, i.e. at the end of the transfer to the pressing station 9.

In consideration of the tilt of the ramp 27 for guiding the plate 25, the inertia of this plate 25, with the clamp system 12, acts as a motor for opening and closing said clamp system 12, and enables a relatively simple maneuvering actuator 26 to be chosen.

The pair of downstream arms 22 is secured to the plate 25 by means of a support 32 in the form of a slide that enables its longitudinal position to be adjusted and adapted, with respect to the pair of arms 21, on the basis of the dimensions of the cutouts 2 and the blanks 5. This support 32 extends parallel to the system 16 for guiding the carriage 15 and it comprises, at its downstream end, the pair of push members 18, which push members 18 are stationary, on the plate 15.

The distance between the push members 18 and the upstream arms 21, when they are in the active position, correspond to the maximum distance between the arms 21, 22, increased by several centimeters, for example, from 5 to 10 cm.

The push members 18 are inserted between two adjacent stations and they catch the box so as to place it onto the removal conveyor 10, without over-filling the soleplate 11.

The pairs of arms 21, 22 and push members 18 are transversely adjustable, so as to be adjusted to the various formats of the box cutouts 2 and blanks 5, by suitable means, not shown.

The simplicity of the conveying device 13 enables the installment of a pair of clamp systems 12 followed by push members 18 on a single carriage 15 to be envisaged, so as to simultaneously transfer a pair of blanks 5 in the case of wrapping and packaging machines that comprise three stations: one station 6 for forming cutouts 2, one station 7 where the box blank 5 is filled, and one pressing station 9 where said blanks 5 are transformed into actual boxes. The distance between these clamp systems is equal to the step established between the various stations.

This transfer can also, depending on the features of the wrapping and packaging machine, and, in particular, depending on the step between the various stations, be performed by means of a plurality of carriages 15 each comprising a clamp system 12 and, for the downstream carriage, the push members 18.

What is claimed is:

1. Device for transferring cardboard box blanks for a wrapping and packaging machine, which device extends between a station for forming cutouts and a conveyor for removing boxes obtained, which transfer is carried out according to a cycle that comprises operations of erecting a cardboard cutout, filling the box blank obtained and pressing said blank at a pressing station in order to transform the blank into a box, which device includes at least a carriage that moves longitudinally under a plurality of stations, including the pressing station and a forming station, on a guide system comprising tracks and/or slides, which guide system is parallel to a soleplate of said wrapping and packaging machine, that extends over the entire length of said stations and on which said box blank advances, which carriage has at least a clamp system comprising mobile upstream arms and downstream arms for gripping said blanks and boxes, and a push member, in which the clamp system and push member enables said blanks and boxes to be moved on said soleplate, then pushed onto said removal conveyor, which upstream and downstream arms, respectively, are arranged in pairs on a plate that is vertically mobile with respect to said carriage in order to move said arms either into an active position for handling the blank when the blank is assembled on said soleplate at the forming station, or into an inactive position below said soleplate after said box has been released at the pressing station; and wherein the upstream arms comprise a projecting portion that is greater in height than that of the downstream arms and push member, which upstream arms are pivotably connected to the plate and pivot about a horizontal shaft, perpendicular to the movement of the carriage, to enable movement into the inactive position by retraction upstream of the machine and below the soleplate of the various stations when said carriage returns and then movement into the active position for handling the blank during the transfer movement performed by said carriage.

2. Device for transferring cardboard box blanks according to claim 1, wherein the plate is guided with respect to the carriage by means of a slide in the form of a ramp, of which the tilt, with respect to the system for guiding said carriage, is on the order of 45° descending from upstream to downstream of the machine, and the movement of said plate on this ramp is performed by an actuator placed between said plate and said carriage.

3. Device for transferring cardboard box blanks according to claim 2, wherein the pair of upstream arms extends beyond its pivot shaft in the form of a crank of which the end is connected to a stationary point of the carriage by means of a connecting rod, which connecting rod imparts, on said pair of upstream arms, a pivoting movement that is combined with the rising-falling movement of the plate with respect to said carriage.

4. Device for transferring cardboard box blanks according to claim 3, wherein the pair of downstream arms is arranged on a slide-type support secured to the plate, which support extends parallel to the system for guiding the carriage, and the support is equipped with means for enabling the adjustment of the position of said pair of downstream arms on said support so as to adjust the space between the projecting portions of the two pairs of arms according to the format of the cutouts and the box blanks.

5. Device for transferring cardboard box blanks according to claim 4, wherein the push member is arranged at the end of the support, which serves as a slide for the downstream arms.

6. Device for transferring cardboard box blanks according to claim 1, wherein the carriage is powered by an actuator-type motor.

7. Device for transferring cardboard box blanks according to claim 1, wherein that the carriage is powered by a linear motor-type drive member, comprising a primary winding arranged on said carriage and a secondary winding associated with the system for guiding the latter.

8. Device for transferring cardboard box blanks according to claim 1, comprising, when there are three stations in line on the wrapping and packaging machine, comprising a forming station, a filling station and a pressing station, a carriage equipped with two clamp systems and a push member, for simultaneously transferring the blanks from station to station.

9. Device for transferring cardboard box blanks according to claim 1, comprising, when there are three stations in line on the wrapping and packaging machine, comprising a forming station, a filling station and a pressing station, two carriages each equipped with a clamp system, and, for the downstream carriage, a push member so as to manage the movements of the box blanks between two consecutive stations.

10. Device for transferring cardboard box blanks as part of a wrapping and packaging machine, wherein the device extends between a station for forming cutouts and a conveyor for removing boxes obtained;

the device is configured to carry out the transfer of cardboard box blanks according to a cycle that comprises erecting a cardboard cutout, filling the box blank obtained and pressing the blank at a pressing station in order to transform the blank into a box;

the device further comprises a carriage that moves longitudinally under a plurality of stations, including the pressing station and a forming station, on a guide system comprising at least tracks or slides, the guide system is parallel to a soleplate of the wrapping and packaging machine, the sole plate extends over substantially an entire length of the plurality of stations and on which the box blank advances;

the carriage has at least a clamp system comprising mobile upstream arms and downstream arms that grip the blanks and boxes, and a push member, the clamp system and push member enable the blanks and boxes to be moved on the soleplate then pushed onto the conveyor;

the upstream and downstream arms, respectively, are arranged in pairs on a plate that is vertically mobile with respect to the carriage in order to move the arms into an active position for handling the blank when the blank is assembled on the soleplate at the forming station and into an inactive position below the soleplate after the box has been released at the pressing station.

11. The device for transferring cardboard box blanks according to claim 10, wherein the upstream arms comprise a projecting portion that is greater in height than that of the downstream arms and push member, the upstream arms are pivotably connected to the plate and pivot about a horizontal shaft, perpendicular to the movement of the carriage, to enable the projection portion to move into the inactive position by retraction upstream of the machine and below the soleplate of the various stations when the carriage returns and to move into the active position for handling the blank during the transfer movement performed by the carriage.

12. The device for transferring cardboard box blanks according to claim 10, where the arms are below the soleplate in the inactive position.

* * * * *